United States Patent [19]

Blanchard et al.

[11] Patent Number: 5,764,690

[45] Date of Patent: Jun. 9, 1998

[54] APPARATUS FOR DESPREADING AND DEMODULATING A BURST CDMA SIGNAL

[75] Inventors: Scott David Blanchard, Mesa; Kenneth Solomon Wreschner; Marc David Brack, both of Chandler; Terry Winningham, Scottsdale, all of Ariz.

[73] Assignee: Motorola, Inc., Schaumburg, Ill.

[21] Appl. No.: 658,043

[22] Filed: Jun. 4, 1996

[51] Int. Cl.⁶ .................................................. H04B 1/707
[52] U.S. Cl. ........................... 375/206; 375/208; 375/260; 375/349; 370/210
[58] Field of Search .................................. 325/200, 206, 325/208, 260, 349; 370/210

[56] References Cited

U.S. PATENT DOCUMENTS

| | | | |
|---|---|---|---|
| 5,202,903 | 4/1993 | Okanoue | 375/349 X |
| 5,343,496 | 8/1994 | Honig et al. | 375/349 X |
| 5,483,529 | 1/1996 | Baggen et al. | 375/260 X |
| 5,535,240 | 7/1996 | Carney et al. | 375/219 |
| 5,559,834 | 9/1996 | Edler | 375/260 |
| 5,621,769 | 4/1997 | Wan et al. | 375/347 |
| 5,629,929 | 5/1997 | Blanchard | 370/201 |
| 5,640,431 | 6/1997 | Bruckert et al. | 375/344 |

*Primary Examiner*—Young T. Tse
*Attorney, Agent, or Firm*—Bradley J. Botsch

[57] ABSTRACT

An asynchronous communications receiver rapidly despreads and demodulating a short, low duty cycle CDMA burst signal. The receiver includes a multichannel despreader (20) for generating a plurality of despread signals (21) corresponding to timing offsets of a spreading code. The plurality of despread signals are respectively supplied to a plurality of demodulators (22) for demodulating each despread signal and for respectively generating a plurality of soft decisions for each demodulated bit values whereby each soft decision is proportional to the quality of the received signal. The plurality of soft decisions are supplied to both a first input of a plurality of multipliers (23) and to a plurality of inputs of a selector (28). The selector processes the soft decisions from each of the demodulators and generates a message indicator (29) when a message is present. The selector also generates a plurality of weights (W1-WN) corresponding to each of the plurality of soft decisions and applies these weights to a second input of the plurality of multipliers. The multipliers multiply the soft decision by its respective weight as supplied from the selector to generate output scaled signals. Finally, a combiner (30) sums the scaled signals to provide an output bit value for applying to a message extractor (32) which generates the actual received digital message.

33 Claims, 8 Drawing Sheets

APPARATUS FOR DESPREADING AND DEMODULATING A BURST CDMA SIGNAL

BACKGROUND OF THE INVENTION

This invention relates to communication receivers and, in particular, asynchronous communication receivers for rapidly despreading and demodulating relatively short and low duty cycle CDMA burst signals.

Classical continuous spread spectrum receivers continuously demodulate and despread received signals. Such receivers need to be synchronized with a transmitter or a received signal only once provided that the received signals remain relatively continuous. As a result, such synchronization does not need to be done rapidly because even if it takes a few seconds to synchronize, synchronization is maintained as long as the received signal remain continuous.

Classical spread spectrum receivers may also be utilized to receive high duty cycle CDMA signals, i.e., signals being transmitted at a duty cycle of ¼ or ⅛. For such high duty cycle CDMA signals, a receiver may store in memory the synchronization for the last time slot and use this information to more quickly obtain what time slot needs to be searched with respect to the next received signal. However, as the duty cycle of the signal decreases and the received CDMA signal becomes a low duty cycle burst, a substantial number of phases would need to be searched by the receiver thereby resulting in substantially increased time for acquiring the received signal.

Hence, there exists a need for an improved communication receiver for despreading and demodulating relatively short, low duty cycle CDMA burst signals in a rapid time.

DETAILED DESCRIPTION OF THE DRAWINGS

The present invention describes an asynchronous communications receiver for rapidly demodulating and despreading short, low duty cycle CDMA burst signals. As an example of the type of CDMA burst signal to be received, the reader is referred to U.S. patent application having Ser. No. 08/636,051, entitled "SYSTEM AND METHOD FOR MULTIPLE ACCESS SHORT MESSAGE COMMUNICATIONS", Attorney Docket No. GE09001, and having the same assignee of the present invention. The subject matter of this application is incorporated by reference herein. There, it is described that certain CDMA burst signals are modulated and transmitted as little as one time per superframe whereby several frames constitute a superframe. Effectively, this could result in CDMA burst signals being transmitted at as little as one time per several hundred total time slots. As mentioned above, if a classical direct sequence spread spectrum (DSSS) receiver were utilized to receive such short, low duty cycle CDMA bursts, the receiver would have to search a plurality of different code phases in order to acquire the signal thereby resulting in substantially increased acquisition time. However, the present invention provides a receiver for demodulating and despreading such low duty cycle CDMA burst signals in a rapid time, i.e., in the time that it takes to receive a unique word, which in a preferred embodiment is only 32 bits, which equates to less than 10 milliseconds (ms) for data rates higher than 3200 bps. Accordingly, on the 33rd bit, the receiver of the present invention is already demodulating and despreading the received CDMA burst signal. This represents a substantial improvement over the prior art wherein synchronization of classical spread spectrum receivers requires a sequential search and dwelling for several bits for each code phase whereby synchronization may not occur for several hundred ms to multiple seconds.

Figure 1:
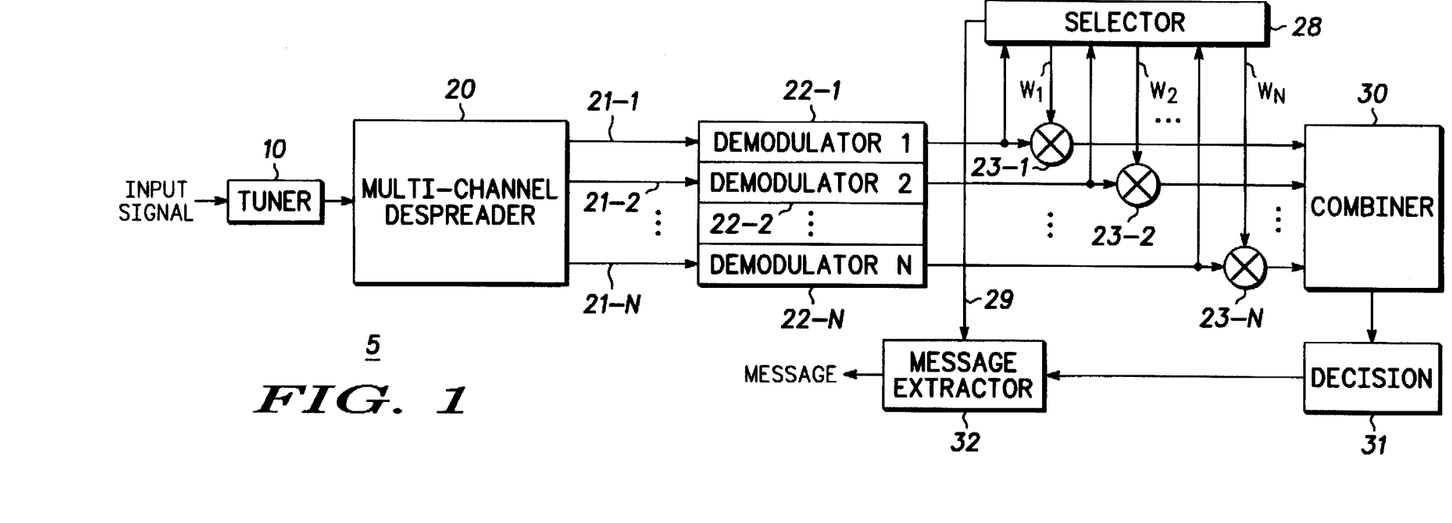
FIG. 1 is a detailed block diagram illustrating a communication receiver for despreading and demodulating short, and low duty cycle CDMA burst signals in a rapid time in accordance with the present invention.

Referring to FIG. 1, a detailed block diagram of asynchronous communication receiver 5 is shown for rapidly despreading and demodulating relatively short, low duty cycle CDMA burst signals. A short, low duty cycle CDMA burst signal is applied to an input of tuner 10 whereby tuner 10 converts the RF signal to a more convenient frequency for further signal processing. For example, the input signal applied at the input of tuner 10 may be at a carrier frequency of 900 MHz and tuner 10 may down convert the signal to a more appropriate frequency for further signal processing such as to a carrier frequency near DC so that digital signal processing techniques can be used. It is noteworthy that tuner 10 may not be necessary if the input signal is already at a carrier frequency that is suitable for further processing.

Figure 9:
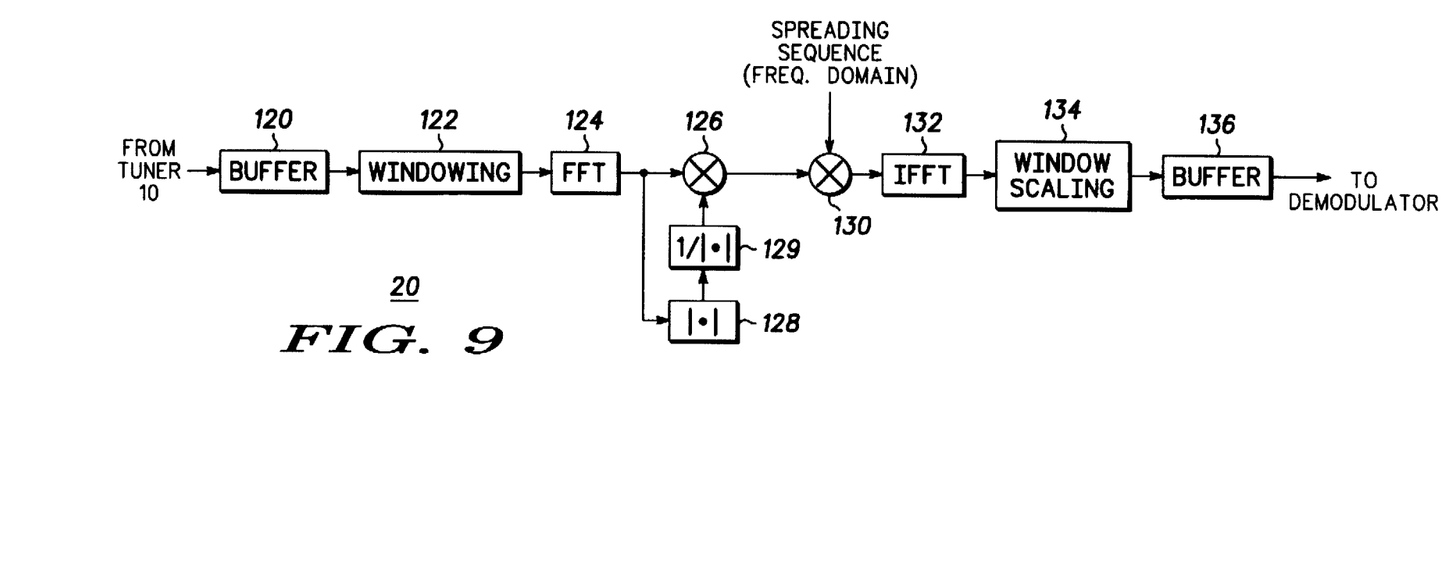

The output of tuner 10 is applied to an input of a multichannel despreader 20 for providing a plurality of despread signals 21-1 through 21-N to N demodulators 22-1 through 22-N. Multichannel despreader 20 includes a plurality of channels, for example, N, for correlating the down converted input signal by a plurality of despreading sequences, respectively, having different phases corresponding to N timing offsets of the spreading code phase. The number of channels is selected based upon phases with potential correlation due to the chip uncertainty between the transmitter and receiver and multipath dispersion. For example, if the transmitter and receiver are synchronized to within 10 chips and the channel is expected to have a dispersion of 0 to 5 chips, then the number of channels would be selected to span a 15 chip code range. The resultant correlation levels provide the N plurality of despread signals, 21-1 through 21-N, to the N demodulators 22-1 through 22-N. One skilled in the art would recognize that there are many methods and circuits which can be used to perform the correlation function. These include the use of a matched filter which can be implemented digitally using digital circuits or software, or the filter can be implemented using analog SAW filters or Acoustic Charge Transport (ACT) devices. Alternatively, classical despreaders using a multiplier to multiply the incoming signal by the spreading sequence followed by a low pass filter, again implemented using analog or digital techniques can be used. A preferred embodiment of multichannel despreader 20 is illustrated in FIG. 9 and will be described in detail hereinafter. Briefly, if the received input signal contains a component that is in phase with one of the despreading sequences of multichannel despreader 20, then a correlation peak will occur at its corresponding channel output. The received signal may contain multiple components corresponding to different code phases due to transmitter filtering, multipath, and receiver filtering.

Demodulators 22-1 through 22-N comprise N demodulators, respectively coupled to receive the N despread signals of multichannel despreader 20, for demodulating the correlation level of each output signal of multichannel despreader 20. In a preferred embodiment, demodulators 22-1 through 22-N perform noncoherent differential phase shift keying (DPSK) demodulation by performing a dot product between correlation level spaced one bit period apart, which essentially means that the demodulators are detecting phase changes from one bit to the next and signal quality. However, it is understood that other demodulators known by those skilled in the art may be used. These include coherent PSK demodulation of the signal which requires carrier recovery, and more complex demodulators which may also include equalization of the bit stream.

The outputs of demodulators 22-1 through 22-6 provide decisions as to whether a logic 1 or a logic 0 bit was transmitted. In a preferred embodiment, demodulators 22-1 through 22-N provide "soft" decisions representing the signal quality of its respective despread signal whereby a digital value of -256, for example, represents a strong indication that a logic 0 was transmitted, a digital value of +255 represents a strong indication that a logic 1 was transmitted, and a digital value of +1 or -1 does not provide a good indication at all as to which logical value was transmitted. Other soft decision ranges which reduce the number of bits required to represent the soft decision may also be used.

The outputs of N demodulators 22-1 through 22-N are respectively applied to first inputs of N multipliers 23-1 through 23-N, and to N inputs of selector 28. Selector 28 processes each of the N output signals from demodulators 22-1 through 22-N and provides a message indicator signal 29 to message extractor 32 and weight calculator 85 for indicating that the correlation level appearing at the output of at least one of the demodulators exceeds a predetermined threshold thereby indicating that a message is present. Additionally, selector 28 processes each of the N output signals from demodulators 22-1 through 22-N and provides a plurality of N weighted signals (W1-WN) to the second input of multipliers 23-1 through 23-N whereby the weight of each signal is calculated based upon the estimated signal quality at the output of the demodulator 22-1 through 22-N corresponding to the multiplier 23-1 through 23-N that is coupled to the signal weight being calculated. A weight of zero corresponds to poor signal quality, while a high weight, such as a weight of 1, corresponds to excellent signal quality.

In the preferred embodiment, the number of multipliers with a non-zero weighted value is limited to a predetermined maximum number, M, which is greater than zero. The value of M is selected based upon the number of expected received code phases which can be estimated from the expected transmitter and receiver filtering and RF multi-path characteristics of the channel. When the maximum number of weights with value other than zero is greater than M, only the largest M weights are used, and the remainder are set to zero. For example, if M is selected to be two, and there are three weights with non-zero values of 0.2, 0.6 and 0.8 based upon signal quality, only two non-zero weights would be supplied to the N multipliers 23–27, with weights of 0.6 and 0.8. In this manner, the best M signals from demodulators 22-1 through 22-N are supplied to combiner 30 via their weighted (i.e., scaled) values as implemented by multipliers 23-1 through 23-N whereby good quality demodulated signals are weighted more heavily than poor quality demodulated signals.

In a preferred embodiment, which uses a noncoherent BPSK demodulator, the number of possible values for the weights is reduced. In this embodiment if the signal quality estimate from each of demodulators 22-1 through 22-N exceeds a predetermined threshold thereby indicating a good signal quality of the output signal of that demodulator, then selector 28 provides a weighted value of 1 to the respective multiplier (23-1 through 23-N) corresponding to that demodulator signal. Otherwise, a weighted value of 0 is supplied to the corresponding multiplier thereby indicating a poor signal quality for that demodulator. In this manner, selector 28 determines which outputs of demodulators 22-1 through 22-N represents the best energy signal and enables these signals to be passed to and provided to combiner 30 by providing a logic 1 to the respective multipliers 23-1 through 23-N. In this embodiment, multipliers 23-1 through 23-N can be implemented using switches. If a logic 1 is applied, the switch passes the respective signal from demodulator 22-1, through 22-N, if a logic zero is applied, the switch outputs a 0 value signal. However, as discussed above, selector 28 may provide weighted values other than 0 or 1 based upon some other modulation scheme or criteria. Additionally, it is understood that selector 28 may provide more than one of the outputs of demodulators 22-1 through 22-N to combiner 30 via selector 28 providing a logic 1 to the second input of more than one multiplier 23-1 through 23-N. In a preferred embodiment, selector 28 may provide up to M logic 1's to N multipliers 23-1 through 23-N thereby allowing for the M best energy signals to be summed by combiner 30.

In a preferred embodiment which uses a noncoherent BPSK demodulator, and limits the weights to a weighted value of zero or one, the implementation can further be simplified if M, the number of non zero weighted values is set to one. In this embodiment, multipliers 23-1 through 23-N can be replaced with a single switch which switches the respective demodulator output from demodulators 22-1 through 22-N with an associated weighted value of 1 to combiner 30, where in this embodiment combiner 30 requires only one input.

Combiner 30 sums the scaled signals appearing at the outputs of multipliers 23-1 through 23-M- and provides a summed signal to decision block 31. Decision block 31 compares this summed/combined signal to a set of thresholds to make a "hard" decision of the received bit value and provides this decision to message extractor 32. In a preferred embodiment, block 31 provides "soft decision" bits which provide a signal quality level to extractor 32. One skilled in the art will recognize that message extractor 32 may use these "soft decisions" to improve the performance of FEC used in the message. With a BPSK signal, the hard bit decision is determined by comparing the combined signal value with zero. A value greater than zero indicates a bit value of 1, a value less than zero indicates a value of 0. Alternately, simply the sign of the decision may be utilized whereby a positive sign bit denotes a bit value of 1 while a negative sign bit denotes a bit value of 0. One skilled in the art, would recognize that other multi-dimensional comparators may be used for QPSK, 8PSK and QAM modulation schemes, and that for these higher order modulation schemes, each decision would generate multiple bit values.

All signals can be either real or complex signals. For example, if a QPSK demodulator is used, then the outputs of N demodulators 22-1 through 22-N would be complex. To properly combine multiple demodulator outputs, weighted signals (W1-WN) would also be complex, and multipliers 23-1 through 23-N would be full complex multipliers, multiplying two complex signal inputs and generating a complex output. For a preferred embodiment using a non-coherent BPSK demodulator, the outputs of demodulators 22-1 through 22-N and weighted signals (W1-WN) would be real. In this embodiment, multipliers 23-1 through 23-N would be real multipliers, multiplying two real valued signals to generate a real valued output.

Message extractor 32 performs the necessary functions to recover a message such as de-interleaving, decoding, and a cyclic redundancy check (CRC) required to extract the information contained in the message. In a preferred embodiment, the message includes the location and status of the transmitter. In an alternate embodiment, the message includes compressed speech information.

Figure 2:
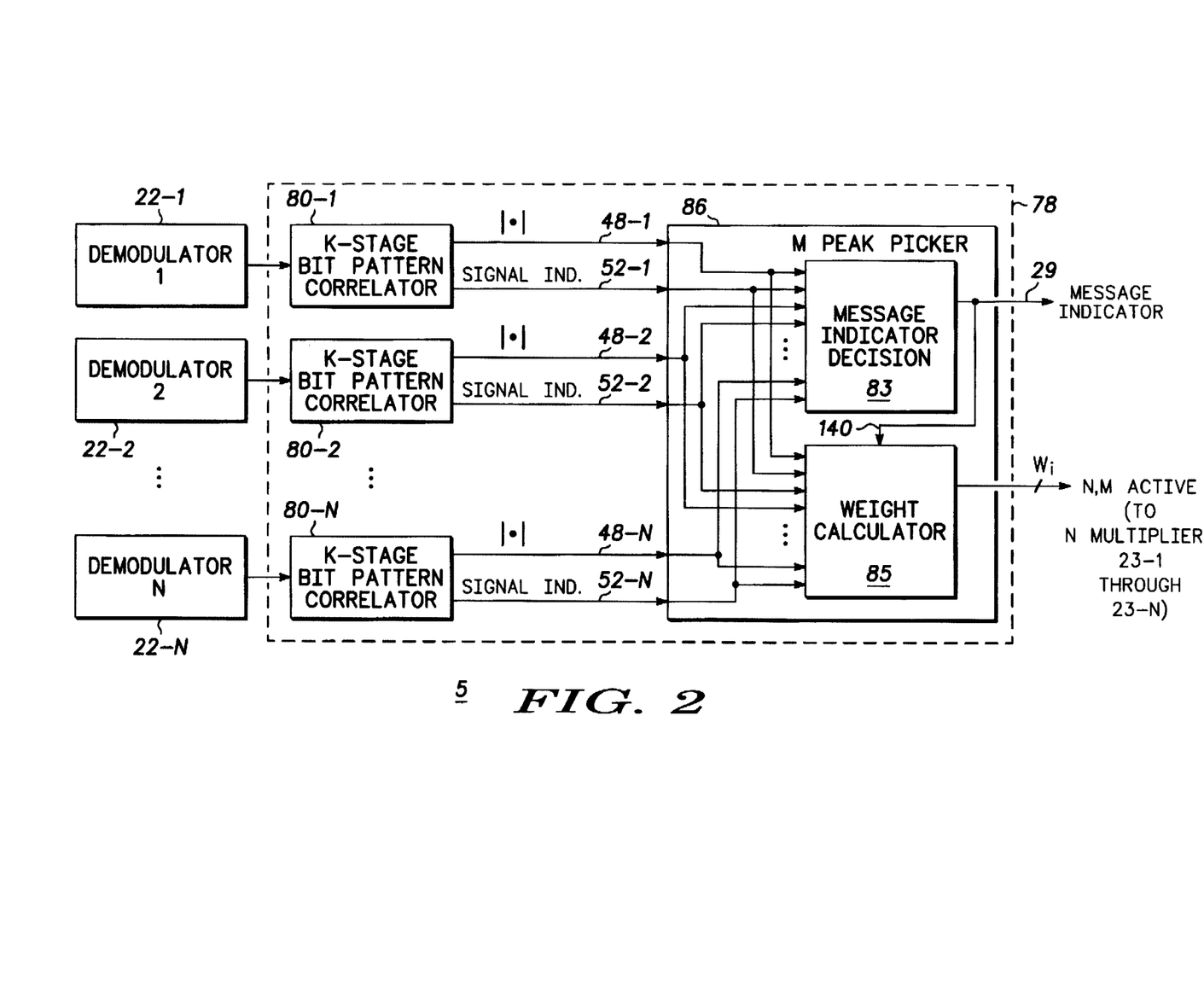
FIG. 2 is a detailed block diagram illustrating a first embodiment of the selector shown in FIG. 1.
Figure 3:
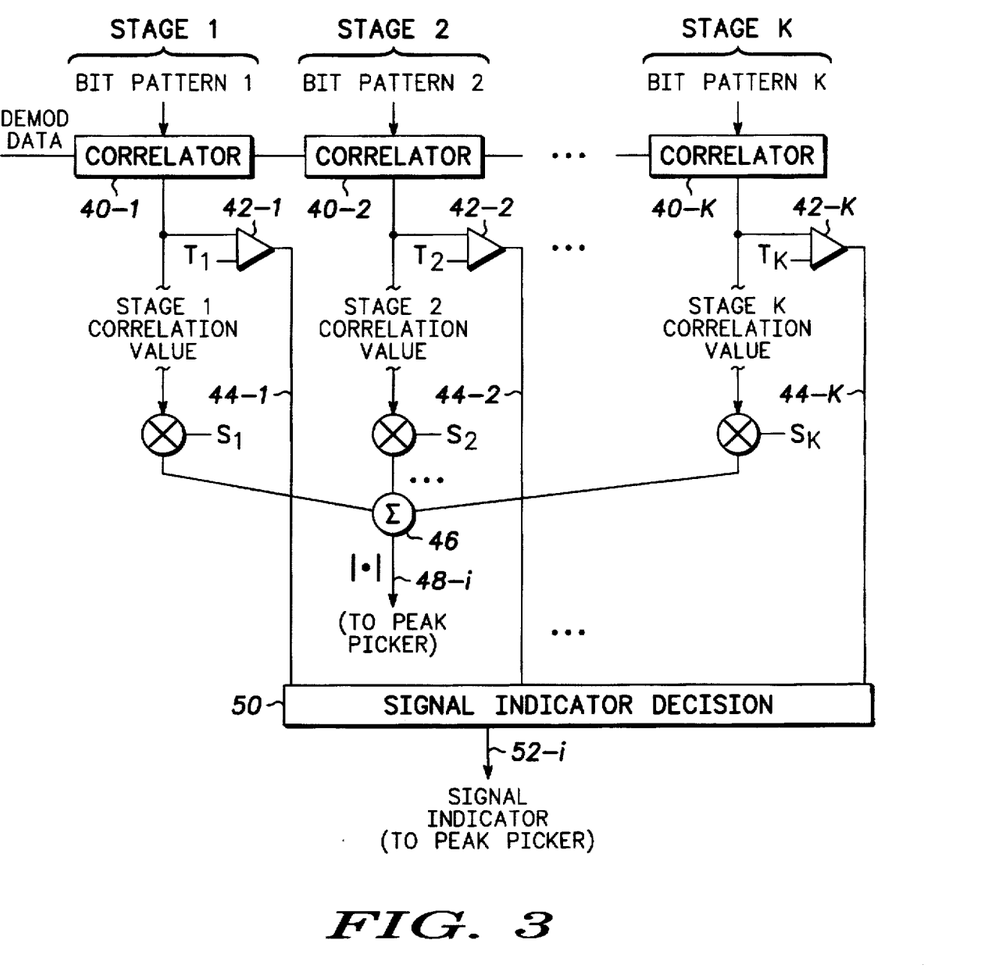
FIG. 3 is a more detailed block diagram illustrating one of the N correlators shown in FIG. 2.

Referring to FIG. 2, a first embodiment of selector 28 is shown as indicated by reference number 78. Selector 78 of FIG. 2 includes N K-stage bit pattern correlators 80-1 through 80-N respectively coupled to the outputs of the N demodulators 22-1 through 22-N. Referring to FIG. 3, a more detailed block diagram of one of the N correlators 80-1 through 80-N is shown. Each stage of the K-stage bit pattern correlators correlates the signal supplied from its corresponding demodulator 22-1 through 22-N by a corresponding bit pattern, as denoted by bit pattern 1 through bit pattern K, via correlators 40-1 through 40-K, and generates a stage correlation value at the output of correlators 40. Correlators 40 can be implemented using a FIR filter built with analog or digital circuits, or software with tap weights equal to the bit pattern. Further, correlators 40 can either generate a real or complex correlation value. In a preferred embodiment, correlators 80-1 through 80-N were two-stage (K=2) bit pattern correlators whereby a first stage utilized a signature sequence bit pattern, and a second stage utilized a unique word bit pattern. Accordingly, the correlation magnitude 48 represents a weighted correlation between the output of its respective demodulator and the signature sequence and unique word bit patterns.

For complex valued demodulator outputs, when using for example a coherent BPSK or QPSK demodulator, the output of correlators 40 will be a complex value, having real and imaginary components. For a preferred embodiment using a noncoherent BPSK demodulator, the demodulator output is real and the output of correlators 40 will also be a real valued signal.

Further, each stage of the K-stage bit pattern correlators compares the stage correlation value to a stage threshold, T1 through TK, via comparators 42-1 through 42-K. When the stage correlation value is complex, these comparators compare the magnitude of the correlation value. If the stage correlation value exceeds the stage threshold, then that stage's indicator signal, 44-1 through 44-K, is set. The K-stage bit pattern correlators also scale each of the stage correlation values by a fixed value, S1 through SK, and sum together the scaled values from each of the stages, via summer 46, to calculate a correlation magnitude, as denoted by reference number 48-i where 1 is an integer value between 1 and N corresponding to its respective correlator 80-1 through 80-N.

In a preferred embodiment, the stage thresholds T1 through TK are adaptively computed by averaging the respective stage correlation over each of the demodulator channels for the previous sample and scaling this average to provide a nearly constant false alarm rate of signal levels. For example, if as scale of 10 was selected, N=3 with the first stage of the K-stage bit pattern correlator having values of 0.2, 0.6 and 0.4, respectively, then the value of T1 to be used for the next calculation would be [10×AVG(0.2, 0.6, 0.4)] or 4. Similarly, if the second stage of the K-stage bit pattern correlator has values of 0.3, 0.1 and 0.2, then the value of T2 to be used for the next calculation would be 2.

In an alternate embodiment, each of the stages may have parallel correlation which performed a bit correlation using hard thresholds and ignoring the signal quality data. While this implementation was found to perform the desired function, it was also found to exhibit a very high false alarm rate. Therefore, the use of quality levels as described above provides superior results.

Each K-stage bit pattern correlator, as shown in FIG. 3, also includes signal indicator decision block for counting the number of stages that have an active stage indicator. If this number exceeds a minimum number P, a decision is made that an active message signal is present at the output of the corresponding-demodulator and the corresponding bit pattern correlator provides an active signal indicator, as denoted by reference number 52-i where 1 is an integer value between 1 and N corresponding to its respective correlator 80-1 through 80-N, indicating that a signal is present. In this embodiment, P was set to 2 such that both the signature sequence and unique word correlation values exceeded their thresholds.

The correlation magnitude signals 48-1 through 48-N and the signal indicators signals 52-1 through 52-N from each of the correlators 80-1 through 80-N, respectively, are supplied to M peak picker 86 where M is an integer between 0 and N. M peak picker 86 includes message indicator block 83 and weight calculator block 85 both of which are coupled to receive correlation magnitude signals 48 and signal indicator signals 52.

Message indicator block 83 receives the signal indicator outputs from each of the N correlators 80-1 through 80-N and provides an active message indicator, via line 29, to message extractor 32 if A or more of the signal indicators from bit pattern correlators 80-1 through 840-N are active, where A is an integer greater than zero. In a preferred embodiment, A was selected to be one, so that the message indicator was active if any of the N correlators 80-1 through 80-N had an active signal indicator.

Weight calculator block 85 of M peak picker 86 selects the M largest correlation magnitudes with active signal indicators appearing at the outputs of correlators 80-1 through 80-N and allows the output of those corresponding demodulators 22-1 through 22-N to be supplied to combiner 30 by providing non-zero weights to its corresponding multipliers 23-1 through 23-N. All other demodulator outputs are multiplied by weights of zero and, thus, are not passed to combiner 30. For example, in a selector with N=10, M=2, and the 3rd, 5th and 7th correlators (80-3, 80-5 and 80-7) have a active signal indicator with weights of 0.6, 0.4 and 0.8, respectively, the weights for the 1st, 2nd, 4th–6th, and 8th–10th multipliers (W1, W2, W4, W5, W6, W8, W9 and W10) would be zero, while the weight for the 3rd multiplier (W3) would be 0.6 and the weight of the 7th multiplier (W7) would be 0.8. Accordingly, weight calculator block 85 provides the N weighted signals to multipliers 23-1 through 23-N where, at most, M have non-zero values, provided that at least M of the N correlators 80-1 through 80-N had active signal indicators associated therewith.

Figure 4:
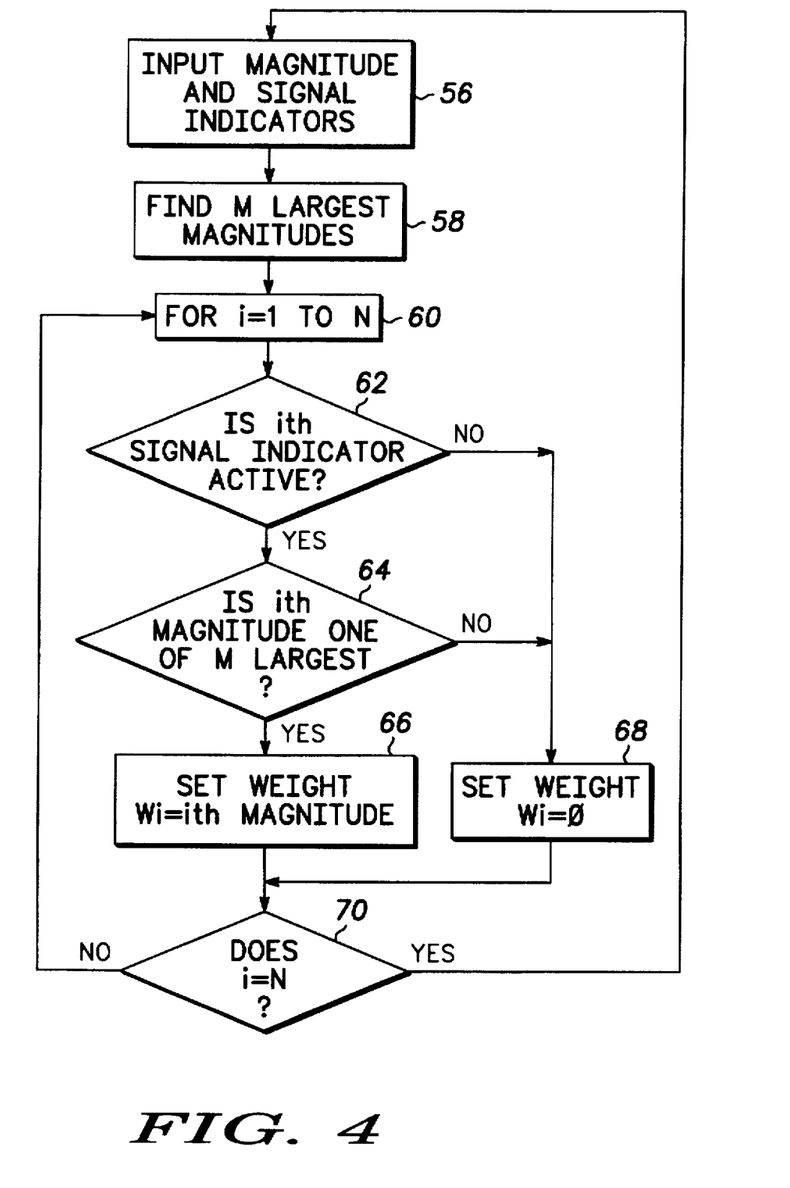
FIG. 4 is a flow chart illustrating a method of operation for the weight calculator block shown in FIG. 2.

Referring to FIG. 4, a flow chart illustrating a method of operation for weight calculator block 85 is shown. In this first embodiment, this flow chart is executed once per message which is determined when the message indicator signal 29 is set. The first step in the method for calculating the weights to be supplied to multipliers 23-1 through 23-N, is to input the magnitude and signal indicators as generated from correlators 80-1 through 80-N, as illustrated in box 56.

Next, the M largest correlation magnitudes are found as illustrated by box 58. This can be accomplished by a simple sort routine that searches for the largest magnitudes of signals 48-1 through 48-N. In a preferred embodiment with M set to 1, a peak register and threshold comparator are used such that if the next channel exceeds the value in the peak register, its value and channel number are stored in the register.

Next, a loop is entered for i=1 to N, as illustrated by box 60. The first step in the loop is to determine whether the ith signal indicator, via signals 52-1 through 52-N, is active, as illustrated by diamond 62. If this is not the case, then the ith weight ($w_i$) is set to zero, as illustrated by box 68.

However, if the ith signal indicator is active, then the next step is to determine whether the ith magnitude is one of the M largest correlation magnitudes, as illustrated by diamond 64. If this is not the case, then the corresponding weight is set to zero, as illustrated by box 68.

However, if the ith magnitude is one of the M largest correlation magnitudes and the ith signal indicator is active, then $w_i$ is set to the ith correlation magnitude, as illustrated by box 66.

Next, to complete the loop, we must determine whether i is equal to N, as illustrated by diamond 70. If i is not equal N, then i is incremented and the operation flow reverts back to box 60. However, if i is equal to N, then the operation flow reverts back to box 56 where new magnitude and signal indicators are input.

In an alternate embodiment, weight calculator 85 supplies a weight of 1 (rather than a weight equal to the correlation magnitude) to the multipliers 23-1 through 23-N corresponding to the demodulators having the M largest correlation magnitudes and active signal indicators. For example, in a selector with N=10, M=2, and the 3rd, 5th and 7th correlator have a active signal indicator with correlation magnitudes of 0.6, 0.4 and 0.8 respectively, the weights for the 1st, 2nd, 4th–6th, and 8th–10th multipliers would be zero, while the weights for the 3rd and 7th multipliers would be 1. Further, in a preferred embodiment, resulting in a simple implementation, M and A are both set to 1 and selector 28, multipliers 23-1 through 23-N and combiner 30 may be replaced by a switch for supplying the best soft decision signal from demodulators 22-1 through 22-N to decision block 31. In this simple case, M peak picker 86 would provide (1) an active message indicator signal to message extractor 32 if the correlation magnitude of at least one of the N correlators 80-1 through 80-N exceeds a predetermined threshold, and (2) one (M=1) active weighted signal to one of the N multipliers corresponding to the channel having the largest correlation magnitude. Likewise, for the case of M=3 and A=1, M peak picker 86 would provide (1) an active message indicator to the message extractor 32 if at least one of the correlation magnitude outputs from the N correlators 80-1 through 80-N exceeds a predetermined threshold, and (2) three (M=3) active weighted signals to three of the N multipliers 23-1 through 23-N corresponding to the channels having the three largest correlation magnitudes from correlators 80-1 through 80-N, assuming that at least 3 of the N correlators provided active signal indicator signals to peak picker 86. If less than 3 of the N correlators provided an active signal indicator signals to peak picker 86, the number of active weighted signals would be equal to the number of correlators with active signal indicators.

Figure 5:
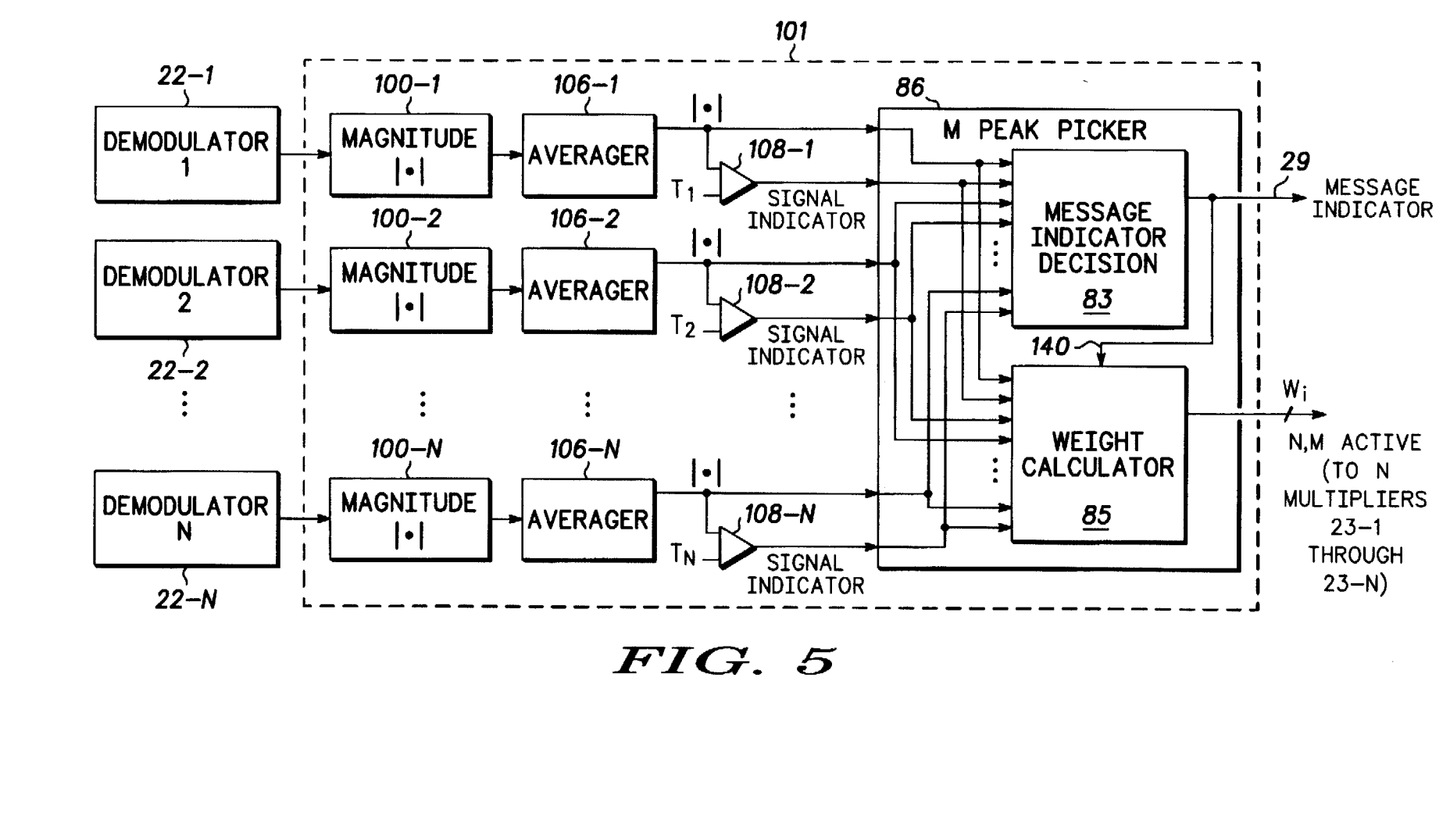
FIG. 5 is a detailed block diagram illustrating a second embodiment of the selector shown in FIG. 1.

Referring to FIG. 5, a second embodiment of selector 28 is shown as denoted by reference number 101. It is understood that components shown in FIG. 5 that are identical to components shown in FIG. 2 are identified by the same reference numbers. Selector 101 of FIG. 5 includes N magnitude blocks 100-1 through 100-N which are respectively coupled to the outputs of the N demodulators 22-1 through 22-N. Magnitude blocks 100-1 through 100-N calculate the energy magnitude of the corresponding signals appearing at the output of the demodulators. Magnitude blocks 100-1 through 100-N may take the form, for example, of well known absolute value or squaring circuits.

The outputs of magnitude blocks 100-1 through 100-N are respectively coupled to N average circuits 106-1 through 106-N for averaging the output of its respective magnitude blocks and for providing output signals to M peak picker 86. Averager circuits 106 may take the form of a moving averaging circuit or an infinite impulse response (IIR) filter.

Comparators 108-1 through 108-N function in a similar manner as comparators 42 of FIG. 3 whereby if the output of its corresponding average circuit exceeds a predetermined threshold, then that channel's signal indicator is active.

In this second embodiment, the flow chart shown in FIG. 4 and previously described is executed once per bit, rather than once per message as done in the first embodiment. This permits the weight values to change during a message and hence, this second embodiment is able to track changes in the multipath characteristics of the channel. By using only energy as a decision, this second embodiment does not require that the transmitted signal contain any unique bit sequences, although some start of message sequence would be required for message extractor to operate correctly. If the demodulator outputs are complex, for example when using a coherent BPSK or QPSK demodulator, this alternative embodiment requires that the demodulator correct for any phase rotation in the signal. This is required so that when the scaled demodulated signals are summed, they are summed in phase. In the first embodiment, this phasing is not required since the unique word correlation will calculate a weight vector which will properly rotate all signals prior to summation. Further, in this second embodiment, message indication 29 will transition from low to high upon detection of energy, and will remain high until no energy is detected. In the first embodiment, message indication 29 will be high only for one bit period, when the unique word correlation is high corresponding to the reception of the unique word sequence of the message.

Figure 6:
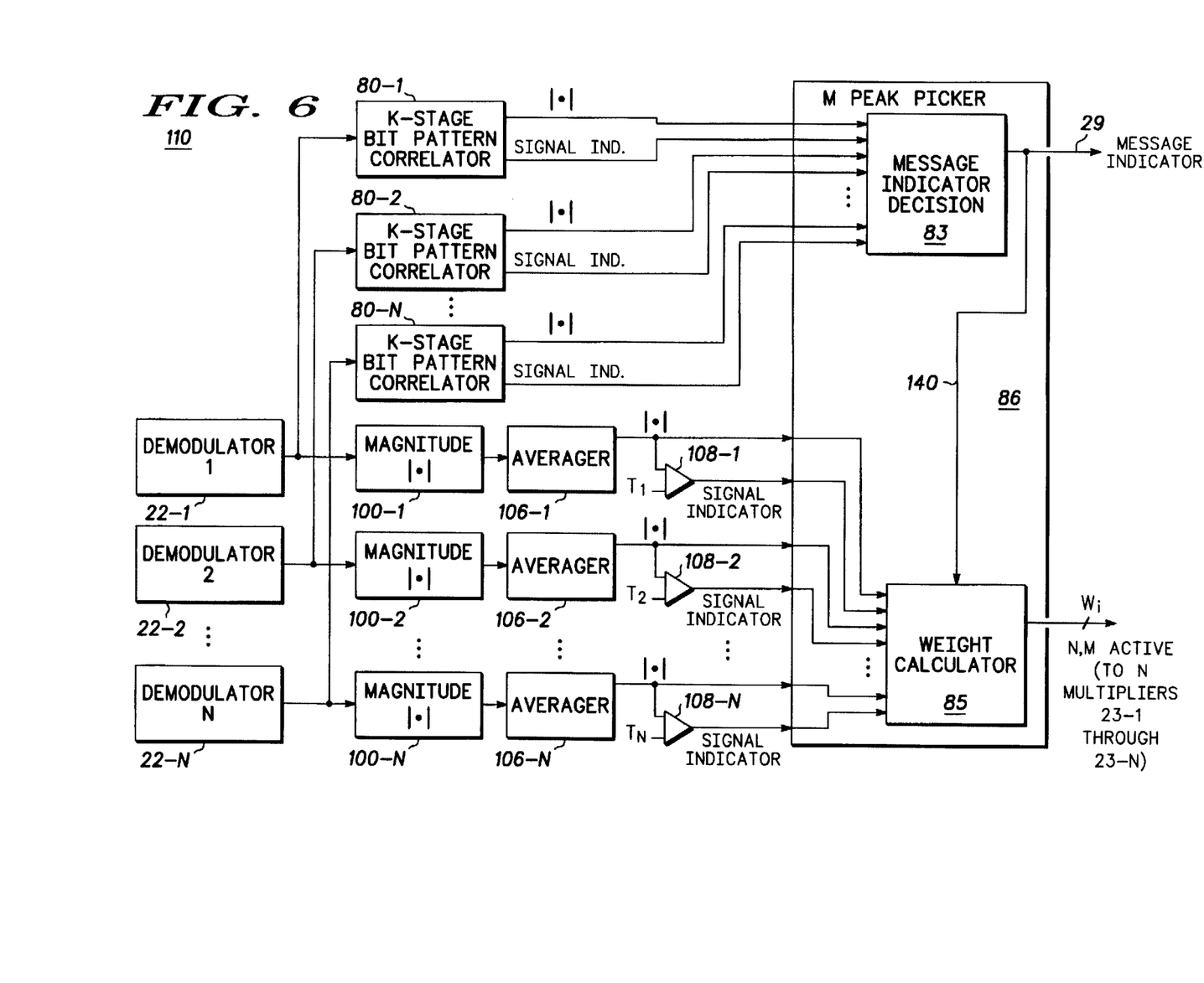
FIG. 6 is a detailed block diagram illustrating a third embodiment of the selector shown in FIG. 1.

Referring to FIG. 6, a block diagram illustrating a third embodiment for selector 28 is shown and indicated by reference number 110. Selector 110 of FIG. 6 combines the unique word correlation, as was described with reference to correlators 80-1 through 80-N of FIG. 2, with magnitude correlation, as was described with reference to magnitude blocks 100 and average blocks 106 of FIG. 3, to provide a selector for implementing features of the combination thereof. It is understood that components shown in FIG. 6 that are identical to components shown in FIGS. 1–5 are identified by the same reference numbers. Selector 110 of FIG. 6 includes correlators 80-1 through 80-N whose outputs (signals 48 and 52) are coupled to message indictor 83 of peak picker 86 for generating message indictor signal 29 in the manner as described above with respect to FIGS. 2 and 3. Selector 110 of FIG. 6 also includes magnitude and averager blocks 100 and 106 whose output are coupled to weight calculator block 85 of peak picker 86 for generating the weight signals to multipliers 23-1 through 23-N, as described above with respect to FIG. 5. Selector 110 of FIG. 6 utilizes the aspects of bit pattern correlation for generating a message indicator signal. This has the advantage of providing a single bit long pulse on message indicator 29 which provides a reliable indicator of the beginning of a message to message extractor 32. Further, Selector 110 of FIG. 6 utilizes the aspects of magnitude correlation for supplying the weight signals to multipliers 23-1 through 23-N and the flow chart shown in FIG. 4, implemented in Selector 110 of FIG. 6, is executed once per bit, rather than once per message as done in the first embodiment shown in FIG. 2 This has the advantage of having weights W1 through WN adapt for each bit of the message which permits tracking of changes in the multipath channel and timing differences between the transmitter and receiver. Such changes are expected when either the transmitter or receiver is placed on a moving platform. By adapting to these changes this third embodiment provides better bit error performance in dynamic environments.

Figure 7:
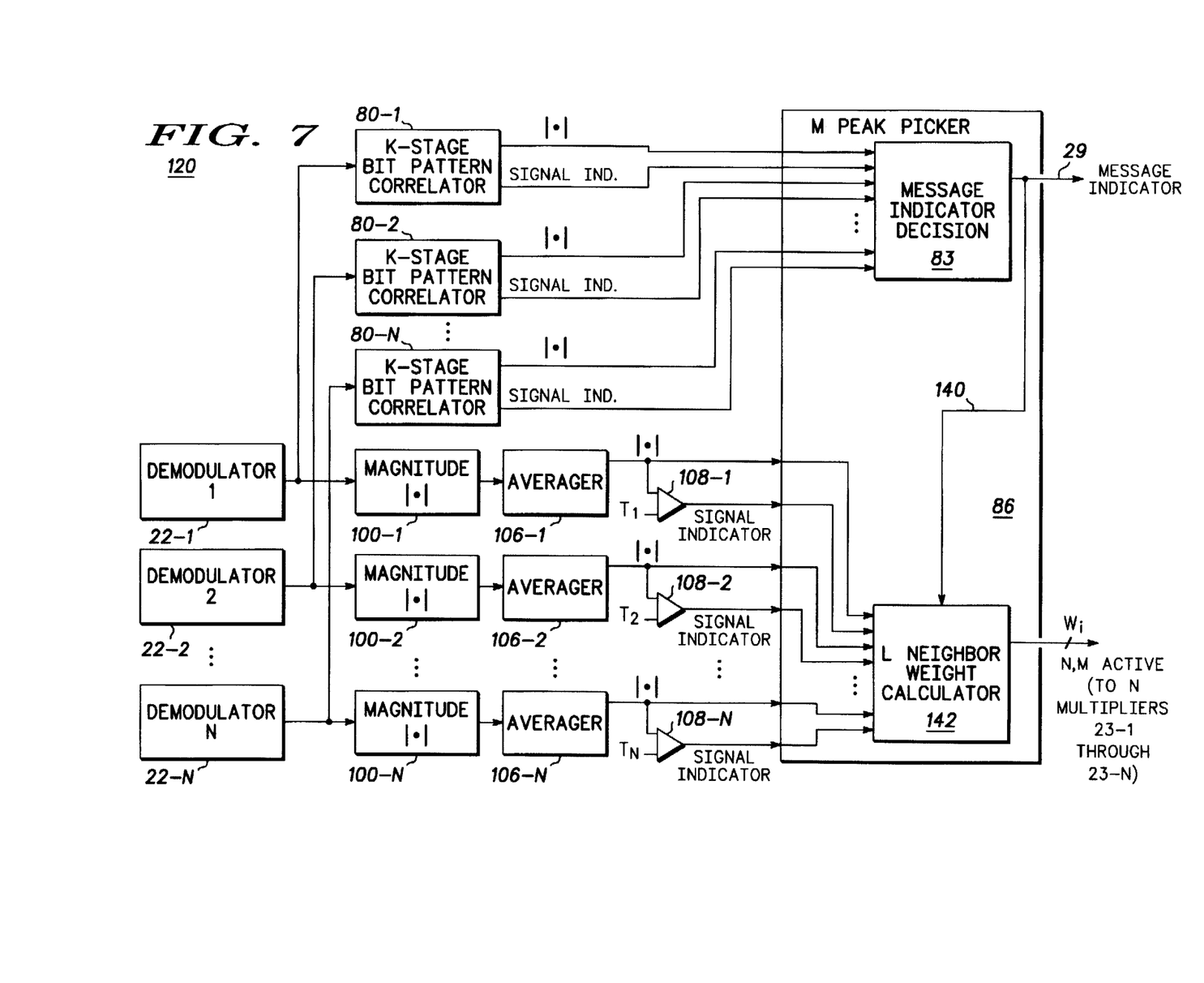
FIG. 7 is a detailed block diagram illustrating a fourth embodiment of the selector shown in FIG. 1.

Referring to FIG. 7, a block diagram illustrating a fourth embodiment of selector 28 is shown as denoted by reference number 120. Selector 120 of FIG. 7 is similar to selector 110 of FIG. 6 with the following exceptions. First, selector 120 includes a modified weight calculator block as referred to as L-neighbor weight calculator block 142 of which the operation flow will be described in detail below. Further, selector 120 includes additional line 140 from message indicator decision block 83 to L-neighbor weight calculator block 142. Selector 120 enables up to L neighbor channels, centered around the channel corresponding to an active signal indicator from message indicator decision block 83, to be provided to multipliers 23-1 through 23-N if their respective magnitudes were one of the M largest. For example, if message indicator decision block 83 provided an active signal indicator for channel 16 and L=2, then channels 14, 15, 16, 17 and 18 would be provided to multipliers 23-1 through 23-N if their magnitude was one of the M largest. By enabling L neighbor channels corresponding to the channel that is active, the accuracy of the correlation magnitude is improved when N becomes large. In the second and third embodiment as N becomes larger, there is a greater probability of summing a channel that does not contain signal energy. For example, if the threshold (T1-TN) is selected to provide a false signal indication probability of 1% on a per channel basis, the probability of summing in a noise channel increases from 9.6% $(1-0.99^{10})$ for N equal to 10, to 63% $(1-0.99^{100})$ for N equal to 100. Using this same example if L=2 and M=3, then only 15 channels maximum could have non-zero weights, resulting in a probability of summing in a noise channel of 14% (1–0.9915) no matter how large N becomes.

Figure 8:
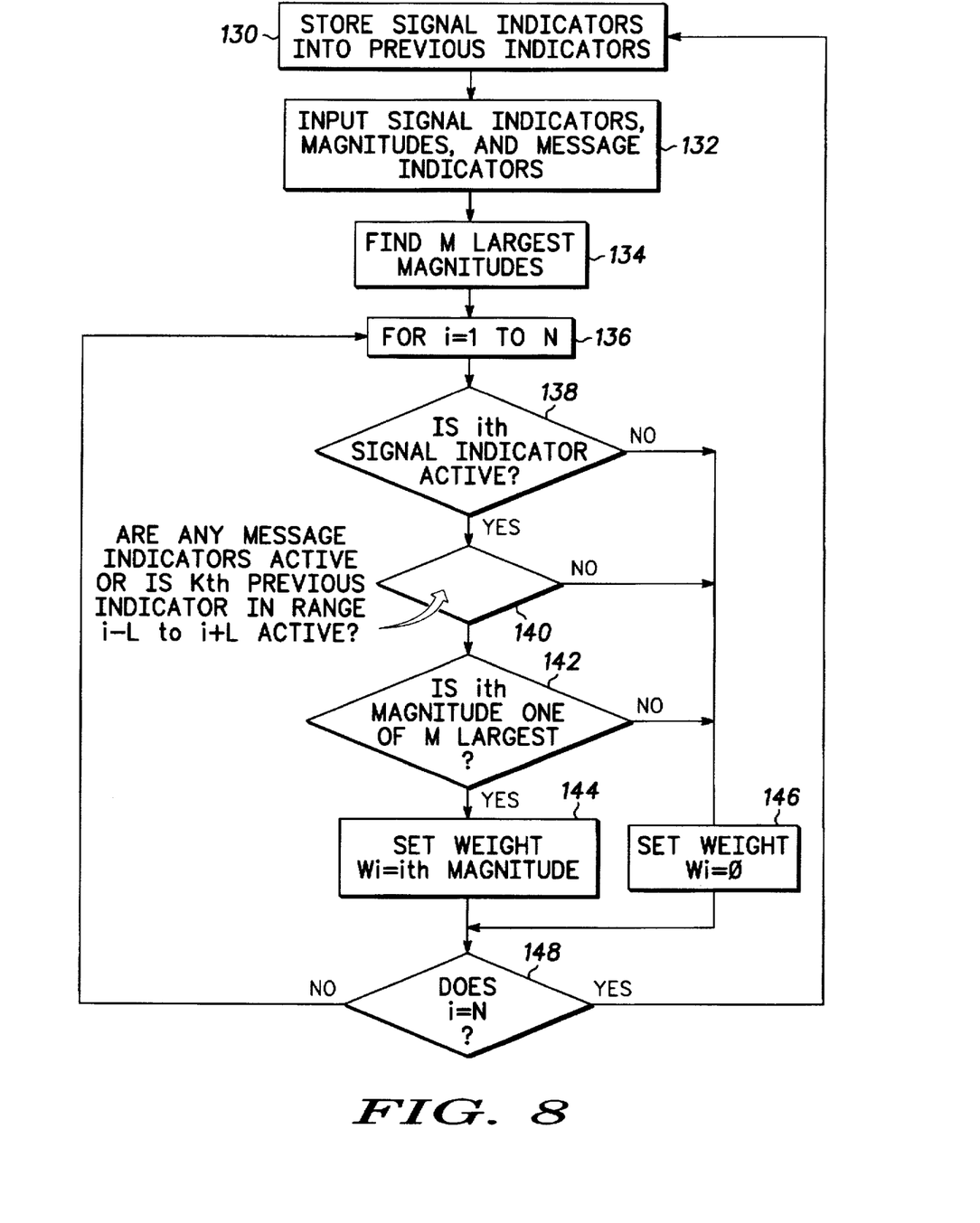
FIG. 8 is a flow chart illustrating a method of operation for the L neighbor weight calculator block shown in FIG. 7; and, FIG. 9 is a detailed block diagram illustrating one of the despreaders within the multichannel despreader shown in FIG. 1.

Referring to FIG. 8, a flow chart illustrating a method of operation for L neighbor weight calculator block 142 is shown. This method is executed once per bit period. The first step in the method is to store signal indicators into previous indicators, as illustrated by box 130.

The next step is to input signal indicators, correlation magnitudes and message indicators, as illustrated by box 132.

The next step is to find the M largest correlation magnitudes, as illustrated by box 134.

Now, a loop is entered for i=1 to N, as illustrated by box 136 whereby the first determination to be made is whether the ith signal indicator is active, as illustrated by diamond 138. If the ith signal is not active, then the weight $W_i$ is set to zero, as illustrated by box 146.

However, if the ith signal indicator is active, then the next determination to be made is whether the message indicator is active or whether there are any active kth previous indicators in the range of i–L to i+L, as illustrated by diamond 140. If this is not the case, then the weight is set to zero, as illustrated by box 146. However, if either of these conditions occur, then the next step is to determine whether the ith magnitude is one of the M largest correlation magnitudes, as illustrated by diamond 142. If this is not the case, then the weight is set to zero, as illustrated by box 146.

However, if the ith magnitude is one of the M largest, then the weight is set to the ith correlation magnitude, as illustrated by box 144.

Finally, the next step is to determine whether i is equal to N whereby if i is not equal to N then the operation flow reverts back to the beginning of the for loop, as illustrated by box 136. However, if i is equal to N, then the operation flow reverts back to the beginning of the routine, as illustrated by box 130.

In a alternate embodiment, rather then setting the weight to the ith correlation magnitude in box 144, the weight is set to 1.

Referring to FIG. 9, a detailed block diagram is shown illustrating a preferred embodiment of multi-channel despreader 20 of FIG. 1. In this embodiment, the N outputs to demodulators 22–26 are provided serially. That is, in this embodiment, the correlation level for demodulator 1 is followed sequentially in time by the correlation level for demodulator 2, then demodulator 3-N, followed by the next correlation level for demodulator 1. One skilled in the art would recognize that if a parallel interface is desired, this can be implemented using a serial to parallel converter or a series of latches connected to the output with sequential clocks.

Multichannel despreader 20 of FIG. 9 includes buffer 120 having an input for receiving the down converted signal from tuner 10 and an output coupled to an input of a windowing block 122. The buffer provides rate adaptation between how fast the fast Fourier transform (FFT) and other post processing occurs and provides for providing overlapping time samples to the windowing block. A minimum overlap of at least the length of the spreading sequence to be correlated against is required to ensure that despreader 20 correctly computes all correlation's without error due to circular convolution or partial correlation. For example, if the multichannel despreader is to correlate against 128 chips of the spreading sequence at a time, a minimum overlap of 128 chips is required. An overlap of less than this can be used to reduce processing at the cost of errors in the calculation.

Windowing block 122 improves the system's ability to excise narrow band interference. Windowing block 122 may take the form of well-known hamming or blackmann-type window function blocks. In a preferred embodiment, no windowing is performed, which reduces the circuit complexity. In this embodiment, the output of buffer 120 is directly coupled to FFT block 124.

The output of windowing block 122 is supplied to an input of FFT block 124 for performing a fast Fourier transform on its input data. Accordingly, FFT block 124 provides at its output the frequency domain representation of the down converted signal from tuner 10. FFT block 124 provides a number of frequency bins, which are a function of the FFT length, whereby if B is the FFT length, then B frequency bins are provided. For each frequency bin supplied from FFT block 124, magnitude block 128 and inverse block 129 calculates the inverse magnitude thereof thereby enabling multiplier 126 to multiply each frequency bin by the inverse of its magnitude and providing an output to multiplier 130. It is understood that magnitude block 128 and inverse block 129 essentially makes all the frequency bins equal in magnitude and, thus, performs a frequency whitening function.

As an example for implementing blocks 128 and 129, if the output of FFT block 124 is a complex number in Cartesian form, i.e., X-jY, then a Cartesian to polar coordinate converter may be utilized to convert such Cartesian coordinates to a polar form having a magnitude and angle as represented in the form of R*exp(jy) where y is equal to the arctangent (ARCTAN) of (Y/X), expo is a complex exponential and * denotes the mathematical complex conjugate function. Following this procedure, a polar to rectangular conversion is performed using an input argument of y and constant magnitude S, providing an output in complex form equal to S* cos (y)-j*S* sin (y).

Multiplier 130 multiplies the output of multiplier 126 with the frequency domain of spreading sequence whereby such spreading sequence may be obtained by taking the FFT of the original spreading sequence. To compute the correlation without errors, the sequence should be appended with all zeros to a length of twice the sequence length. For example, if the multichannel despreader is to correlate against 128 chips of the spreading sequence at a time, the frequency domain spreading sequence is computed by taking the FFT of the sequence of 128 chips followed by at least 128 zeros. A fewer number of zeros can be appended at the expense of adding errors in the calculation due to circular convolution.

One skilled in the art would recognize that there are many ways to implement blocks 126, 128, 129 and 130 which provide the same mathematically identical result. For example a polar arithmetic version may be used. In this version, the output of FFT 124 is coupled to an ARCTAN function for calculating the inverse four quadrant tangent of the FFT complex value, y. This phase is then added with the argument of the frequency domain version of the spreading sequence, stored in polar coordinates. A polar to Cartesian converter then converts from the polar number represented by the magnitude of the stored spreading sequence and the phase argument equal to the previously computed sum. This alternate implementation is mathematically identical to the previously described embodiment.

The output of multiplier 130 is provided to inverse FFT (IFFT) block 132 for calculating the inverse fast Fourier thereof. Accordingly, this now provides a despread time domain signal. This despread time domain signal includes valid time bins which include correlation values and invalid time bins containing circular convolution data. One skilled in the art can readily determine the valid time bins which do not contain circular convolution data based upon the overlap value in 122, and the zero padding in the spreading sequence used as input to multiplier 130.

In addition, these bins have non-uniform magnitude due to the windowing performed in windowing 122. Window scaling block 134 performs the necessary scaling to normalize these magnitudes and prevent an amplitude modulation response at the output of the despreader as due to windowing block 122. In a preferred embodiment, which performs no windowing and window block 122 is removed, scaling block 134 is also removed. In this embodiment, the output of IFFT block 132 is directly coupled to buffer 136.

Finally, the output of window scaling 134 is passed through buffer 136 before being output to one of its corresponding demodulators 22–26. Buffer 136 is used to permit the processing of demodulators 22–26 to be performed at a different clock frequency and also is used to discard invalid time bins so that only valid time bins are processed by demodulators 22–26.

One of ordinary skill in the art should understand that the despreader shown in FIG. 6 is a frequency domain implementation of an adaptive matched filter with a very fast response whitening function as provided by magnitude block 128 and inverse block 129. This permits despreader 20 to operate in the presence of large, non-stationary narrow band interference. This implementation is capable of adapting its filter function for every FFT frame which in a preferred embodiment is a single bit period. During testing, despreader 20 was able to process a signal with interference 50 dB above the signal, although the system had a spreading gain of approximately 23 dB. This permits the despreader to frequency share with other communication systems, including those which have non-stationary statistics such as frequency hoppers.

By now it should be apparent from the foregoing discussion that a novel asynchronous communications receiver has been provided for despreading and demodulating a short, low duty cycle CDMA burst signal in a rapid time. The receiver includes a multichannel despreader for generating a plurality of despread signals corresponding to timing offsets of a spreading code that was initially used to spread the message signal. The plurality of despread signals are respectively supplied to a plurality of demodulators for demodulating each despread signal and for respectively generating a plurality of soft decisions for each demodulated bit values whereby each soft decision is proportional to the quality of the received signal. The plurality of soft decisions provided by the demodulators are supplied to both a first input of a plurality of multipliers and to a plurality of inputs of a selector. The selector processes the soft decisions from each of the demodulators and generates a message indicator when the selector detects that a message is present. The selector also generates a plurality of weights corresponding to each of the plurality of soft decisions from the plurality of demodulators and applies these weights to a second input of the plurality of multipliers. The multipliers multiply the soft decision from each of the demodulators by its respective weight as supplied from the selector to generate output scaled signals. Finally, a combiner sums the scaled signals to provide an output bit value for applying to a message extractor which generates the actual received digital message.

While the invention has been described in specific embodiments thereof, it is evident that many alternations, modification and improvements may be apparent to those of ordinary skill in the art. Accordingly, it is intended that all such alternations, modifications, and variations fall within the broad scope of the appended claims.

What is claimed is:

1. A receiver for detecting and demodulating a digital message, the digital message being transmitted by a direct sequence spread spectrum transmitter with a spreading code, the receiver comprising:

a multichannel despreader responsive to an input signal for generating a plurality of despread signals, each of the despread signals corresponding to a timing offset of the spreading code;

a plurality of demodulators for demodulating each of the despread signals and for respectively generating a plurality of soft decisions each having a value representing the signal quality of its respective despread signal;

a selector, coupled to the plurality of demodulators, for processing the plurality of soft decisions to generate a message indicator signal when the digital message is detected and for generating a plurality of signal weights corresponding to each of the plurality of soft decisions;

a plurality of multipliers, respectively coupled to the plurality of demodulators, for multiplying the plurality of soft decisions by the plurality of signal weights, respectively, to generate a plurality of scaled signals;

a combiner for summing the plurality of scaled signals to generate a summed signal; and a decision block for comparing the summed signal to a predetermined value to determine the bit value of the digital message.

2. The receiver of claim 1 wherein the plurality of signal weights have a value of 0 indicating poor signal quality or a value of 1 indicating good signal quality.

3. The receiver of claim 1 wherein each of the plurality of demodulators is a non-coherent BPSK demodulator for computing the dot product of its respective one of the plurality of despread signals with itself delayed by one bit period.

4. The receiver of claim 1 wherein the selector includes:

a plurality of bit pattern correlators respectively coupled to receive the plurality of soft decisions, each one of the plurality of bit pattern correlators generating a correlation magnitude and a signal indicator signal for indicating the presence of a message; and a peak picker including:

a message indicator for counting the number of signal indicator signals from the plurality of bit pattern correlators that are asserted and for asserting a message indicator signal if M or more signal indicator signals are active, where M is an integer greater than zero; and a weight calculator, coupled to receive the message indicator signal from the message indicator and the correlation magnitude and the signal indicator signals from the plurality of bit pattern correlators for generating the plurality of weights to be supplied to the plurality of multipliers wherein the weight calculator provides weights to the plurality of multipliers for enabling M of the plurality of soft decisions respectively corresponding to the M largest correlation magnitudes having active message indicator signals to be provided to the combiner.

5. The receiver of claim 4 wherein each one of the plurality of bit pattern correlators includes:

a plurality of correlators for correlating each of the plurality of soft decisions from the plurality of demodulators with at least one sequential bit pattern and for respectively generating a plurality of correlation values, signal indicator circuitry coupled to receive the plurality of correlation values for activating the signal indicator signal if P of the plurality of correlation values exceeds a predetermined threshold, where P is an integer greater than zero; and a summer for combining the plurality of correlation values from each of the plurality of correlators to generate the correlation magnitude.

6. The receiver of claim 5 wherein the predetermined threshold is determined from the average of all of the correlation values over a previous bit thereby providing a nearly constant false alarm rate independent of signal levels.

7. The receiver of claim 4 wherein the method of operation of the weight calculator includes the following steps:

receiving the correlation magnitude and the signal indicator signal from each of the plurality of bit pattern correlators;

determining the M largest correlation magnitudes, where M is an integer greater than zero;

determining whether the signal indicator signal corresponding to each of the plurality of bit correlators is active;

if the signal indicator signal is not active, then setting the weight corresponding to that signal indicator signal to zero; and if the signal indicator signal is active and the signal indicator signal corresponds to the one of the M largest correlation magnitudes, then setting one of the plurality of weights corresponding to that signal indicator signal to a first value.

8. The receiver of claim 7 wherein the first value is the correlation magnitude corresponding to the active signal indicator signal.

9. The receiver of claim 7 wherein the first value is one.

10. The receiver of claim 1 wherein the selector includes:

a plurality of magnitude circuits respectively coupled to receive the plurality of soft decisions for calculating the magnitude of each of the plurality of soft decisions;

a plurality of comparators respectively coupled the plurality of magnitude circuits for comparing each of the magnitudes to a threshold and for activating a signal indicator signal for indicating the presence of a message if the magnitude exceeds the threshold; and a peak picker including:

a message indicator for counting the number of signal indicator signals from the plurality of comparators that are active and for activating a message indicator signal if M or more signal indicator signals are active, where M is an integer greater than zero; and a weight calculator, coupled to receive the message indicator signal from the message indicator, the magnitudes of each of the magnitude circuits, and the signal indicator signals from the plurality of comparators, for generating the plurality of weights to be supplied to the plurality of multipliers wherein the weight calculator provides weights to the plurality of multipliers for enabling M of the plurality of soft decisions respectively corresponding to the M largest magnitudes having active message indicator signals to be provided to the combiner.

11. The receiver of claim 10 wherein the threshold is determined from the average of the magnitudes of all of the plurality of soft decisions over a previous bit thereby providing a nearly constant false alarm rate independent of signal levels.

12. The receiver of claim 10 wherein the selector further includes a plurality of averaging circuits respectively coupled to the plurality of magnitude circuits for calculating a local average of each of the magnitudes from the plurality of magnitude circuits.

13. The receiver of claim 1 wherein the selector includes:

a plurality of bit pattern correlators respectively coupled to receive the plurality of soft decisions, each one of the plurality of bit pattern correlators generating a correlation magnitude and a signal indicator signal for indicating the presence of a message;

a plurality of magnitude circuits respectively coupled to receive the plurality of soft decisions for calculating the magnitude of each of the plurality of soft decisions;

a plurality of comparators respectively coupled the plurality of magnitude circuits for comparing each of the magnitudes to a threshold and for activating the signal indicator signal for indicating the presence of the message if the magnitude exceeds the threshold; and a peak picker including:

a message indicator for counting the number of signal indicator signals from the plurality of bit pattern correlators that are active and for activating a message indicator signal if M or more signal indicator signals are active, where M is an integer greater than zero; and a weight calculator coupled to receive the message indicator signal from the message indicator and the magnitudes and signal indicator signals from the plurality of comparators for generating the plurality of weights to be supplied to the plurality of multipliers wherein the weight calculator provides weights to the plurality of multipliers for enabling M of the plurality of soft decisions respectively corresponding to the M largest magnitudes having active message indicator signals to be provided to the combiner.

14. The receiver of claim 13 wherein the threshold is determined from the average of the magnitudes of all of the plurality of soft decisions over a previous bit thereby providing a nearly constant false alarm rate independent of signal levels.

15. The receiver of claim 1 wherein the selector includes:

a plurality of bit pattern correlators respectively coupled to receive the plurality of soft decisions, each one of the plurality of bit pattern correlators generating a correlation magnitude and a signal indicator signal for indicating the presence of a message;

a plurality of magnitude circuits respectively coupled to receive the plurality of soft decisions for calculating the magnitude of each of the plurality of soft decisions;

a plurality of comparators respectively coupled the plurality of magnitude circuits for comparing each of the magnitudes to a threshold and for activating the signal indicator signal for indicating the presence of the message if the magnitude exceeds the threshold; and a peak picker including:

a message indicator for counting the number of signal indicator signals from the plurality of bit pattern correlators that are active and for activating a message indicator signal if M or more signal indicator signals are active, where M is an integer greater than zero; and an L neighbor weight calculator coupled to receive the message indicator signal from the message indicator and the magnitudes and signal indicator signals from the plurality of comparators for generating the plurality of weights to be supplied to the plurality of multipliers wherein the L neighbor weight calculator provides weights to the plurality of multipliers for enabling up to L neighbor soft decisions centered around each soft decision corresponding to active message indicator signals to be provided to the combiner if such corresponding magnitudes are one of the M largest.

16. The receiver of claim 15 wherein the threshold is determined from the average of the magnitudes of all of the plurality of soft decisions over a previous bit thereby providing a nearly constant false alarm rate independent of signal levels.

17. The receiver of claim 15 wherein the method of operation of the L neighbor weight calculator includes the following steps:

storing previous bit signal indicator signals from each of the plurality of bit pattern correlators;

receiving the magnitudes and the signal indicator signals from each of the plurality of bit pattern correlators and the message indicator signal from the message indicator for a current bit;

determining the M largest magnitudes, where M is an integer greater than zero;

determining whether the signal indicator signal corresponding to each of the plurality of bit correlators is active;

for each signal indicator signal not active, setting the weight corresponding to that signal indicator signal to zero; and determining whether the message indicator signal is active or whether any of the L previous bit signal indicator signals centered around active signal indicator signals are active;

for each signal indicator signal not active, setting the weight corresponding to that signal indicator signal to zero;

if the signal indicator signal is active and the signal indicator signal corresponds to the one of the M largest magnitudes, setting one of the plurality of weights corresponding to that signal indicator signal to a first value.

18. The receiver of claim 17 wherein the first value is the magnitude corresponding to the active signal indicator signal.

19. The receiver of claim 17 wherein the first value is one.

20. The receiver of claim 1 wherein the multichannel despreader includes:

Fourier transform means for generating the Fourier transform of the input signal;

means for generating the inverse magnitude of the Fourier transform of the input signal;

means for multiplying the Fourier transform of the input signal by its inverse magnitude for generating a substantially constant magnitude signal thereby performing a whitening function on the Fourier transform of the input signal;

means for multiplying the substantially constant magnitude signal by a frequency domain version of the spreading code and for generating a despread signal; and inverse Fourier transform means for determining the inverse Fourier transform of the despread signal.

21. The receiver of claim 1 wherein the decision block provides soft decision bits indicating signal quality of the bit value of the digital message.

22. A receiver for detecting and demodulating a digital message, the digital message being transmitted by a direct sequence spread spectrum transmitter with a spreading code, the receiver comprising:

a multichannel despreader responsive to an input signal for generating a plurality of despread signals, each of the despread signals corresponding to a timing offset of the spreading code;

a plurality of demodulators for demodulating each of the despread signals and for respectively generating a plurality of soft decisions each having a value proportional to signal quality of its respective despread signal;

a combiner;

selection circuitry, coupled to the plurality of demodulators, for processing the plurality of soft decisions to generate a message indicator signal when the digital message is detected and for enabling M of the best soft decisions to be supplied to the combiner, where M is an integer greater than zero, the combiner summing the M best signals to generate a summed signal; and a decision block for comparing the summed signal to a predetermined value to determine the current bit value.

23. The receiver of claim 22 wherein the selection circuitry determines the M best soft decisions by determining which soft decisions have the largest correlation magnitude with at least one predetermined bit pattern.

24. The receiver of claim 22 wherein the selection circuitry determines the M best soft decisions by determining which soft decisions have the largest energy magnitude.

25. The receiver of claim 22 wherein the selection circuitry determines the M best soft decisions by (1) determining whether a signal is present by determining the correlation magnitude of each soft decision with at least one predetermined bit pattern, and (2) by determining which soft decisions have the largest energy magnitude.

26. The receiver of claim 22 wherein the selection circuitry determines the M best soft decisions by (1) determining whether a signal is present by determining the correlation magnitude of each soft decision with at least one predetermined bit pattern, and (2) by determining which L soft decisions, centered around the soft decisions corresponding to those determined to have a signal present, have the largest energy magnitude, where L is an integer greater than zero.

27. The receiver of claim 22 wherein the multichannel despreader includes:

Fourier transform means for generating the Fourier transform of the input signal;

means for generating the inverse magnitude of the Fourier transform of the input signal;

means for multiplying the Fourier transform of the input signal by its inverse magnitude for generating a substantially constant magnitude signal thereby performing a whitening function on the Fourier transform of the input signal;

means for multiplying the substantially constant magnitude signal by a frequency domain version of the spreading code and for generating a despread signal; and inverse Fourier transform means for determining the inverse Fourier transform of the despread signal.

28. A method for detecting and demodulating a digital message, the digital message being transmitted by a direct sequence spread spectrum (DSSS) transmitter with a spreading code, the method comprising the steps of:

receiving an input signal generated by a DSSS technique;

despreading the input signal and thereby generating a plurality of despread signals, each of the despread signals corresponding to a timing offset of the spreading code;

demodulating each of the despread signals and thereby respectively generating a plurality of soft decisions each having a value proportional to signal quality of its respective despread signal;

selecting the M best soft decisions;

summing the M best soft decisions to generate a summed signal; and comparing the summed signal to a predetermined value to determine the bit value of the digital message.

29. The method of claim 28 wherein the steps of selecting the M best soft decisions and summing the M best soft decisions includes the substeps of:

processing the plurality of soft decisions to generate a message indicator signal when the digital message is detected;

generating a plurality of signal weights corresponding to each of the plurality of soft decisions;

multiplying the plurality of soft decisions by the plurality of signal weights, respectively, to generate a plurality of scaled signals; and summing the plurality of scaled signals to generate the summed signal.

30. The method of claim 28 wherein the step of selecting the M best soft decisions includes the step of determining which soft decisions have the largest correlation magnitude with at least one predetermined bit pattern.

31. The method of claim 28 wherein the step of selecting the M best soft decisions includes the step of determining which soft decisions have the largest energy magnitude.

32. The method of claim 28 wherein the step of selecting the M best soft decisions includes the steps of:

determining whether a signal is present by determining the correlation magnitude of each soft decision with at least one predetermined bit pattern; and determining which soft decisions have the largest energy magnitude.

33. The method of claim 28 wherein the step of selecting the M best soft decisions includes the steps of:

determining whether a signal is present by determining the correlation magnitude of each soft decision with at least one predetermined bit pattern; and by determining which L soft decisions, centered around the soft decisions corresponding to those determined to have a signal present, have the largest energy magnitude, where L is an integer greater than zero.

* * * * *